Sept. 8, 1953  A. PETERS ET AL  2,651,246
POWER-DRIVEN HARROW
Filed March 20, 1951  2 Sheets-Sheet 2
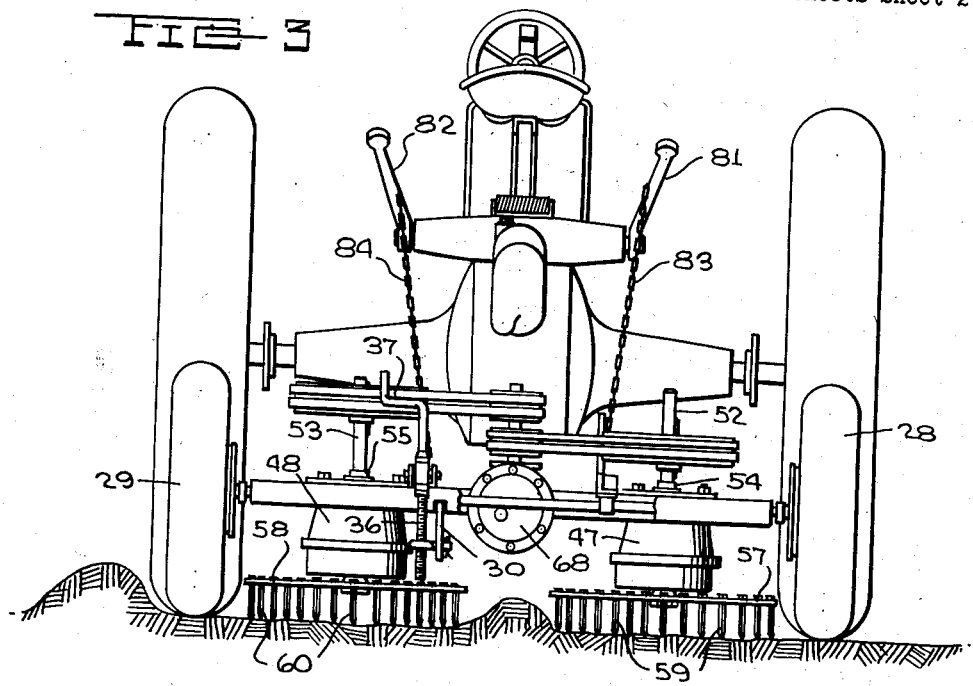
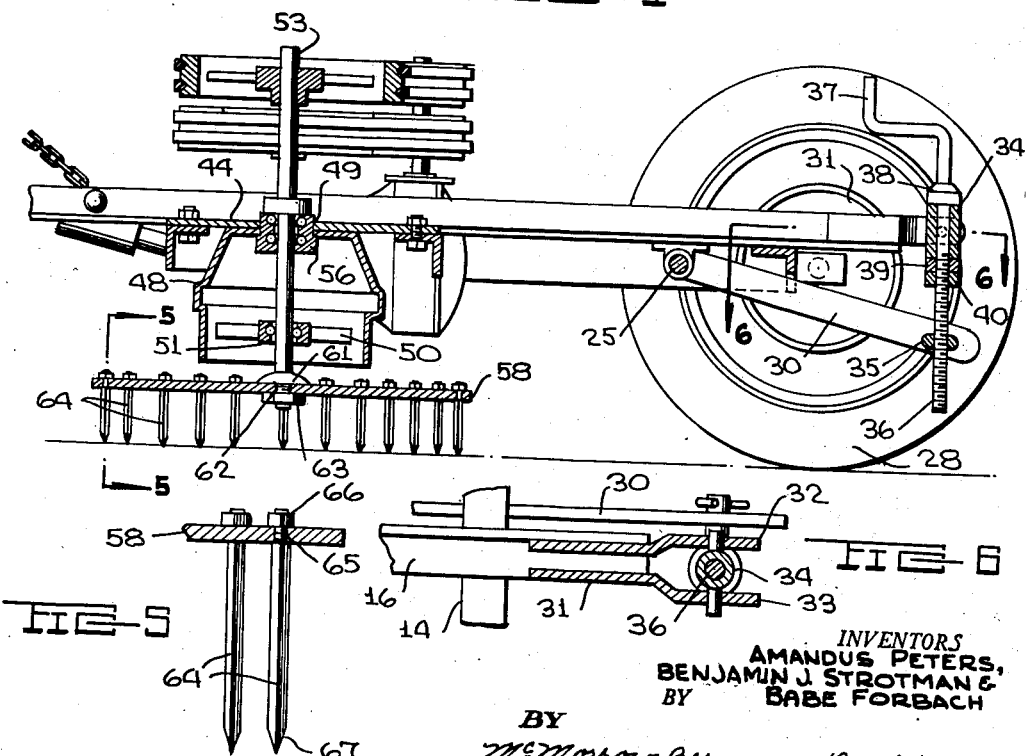
INVENTORS
AMANDUS PETERS,
BENJAMIN J. STROTMAN &
BY  BABE FORBACH
McMorrow, Berman & Davidson
ATTORNEYS Patented Sept. 8, 1953

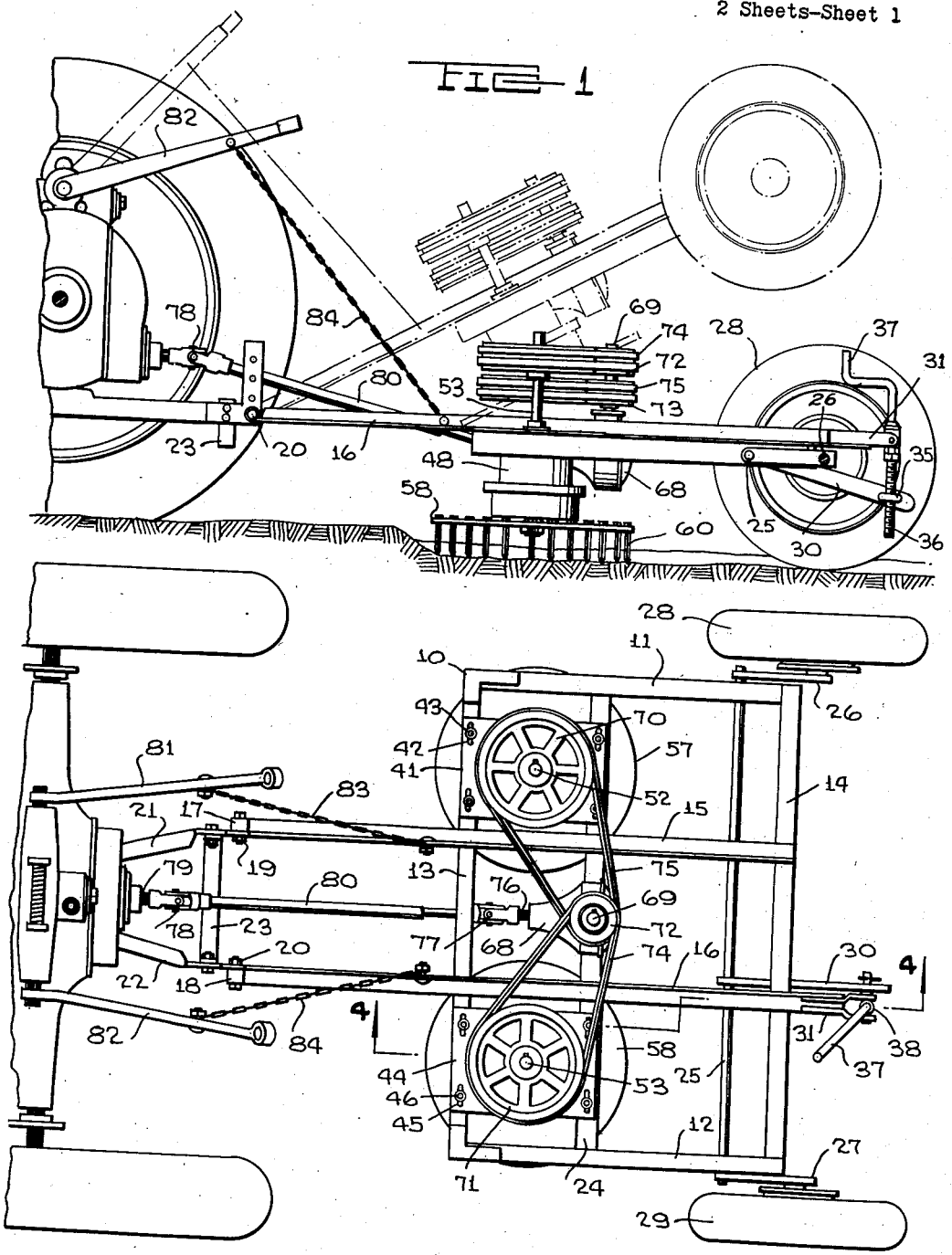

2,651,246

UNITED STATES PATENT OFFICE 2,651,246

POWER-DRIVEN HARROW

Amandus Peters, Phosipney Forbach, and Benjamin J. Strotman, Casa Grande, Ariz.; said Phosipney Forbach now by change of name Babe Forbach Application March 20, 1951, Serial No. 216,576

2 Claims. (Cl. 97—43)

This invention relates to agricultural harrows, and more particularly to a power operated harrow adapted to be simultaneously pulled and driven by a farm tractor to cross-harrow agricultural land over which it is pulled by a tractor.

It is among the objects of the invention to provide an improved agricultural harrow which can be simultaneously pulled and driven by a farm tractor to cross-harrow plowed land while the harrow and associated tractor move in the direction of the plow furrows; which can also be used to cultivate the land between the rows of a row crop and as a cotton chopper to block cotton or other row crops; which is self-supporting so that it can be adjusted to operate at various selected depths in the soil and can be raised to an inoperative position by the implement lift mechanism of the tractor; which is arranged to eliminate side thrust so that it tracks freely behind the tractor; which is self-cleaning and does not pile up earth and debris along the rows of row crops; and which is simple and durable in construction, economical to manufacture, easy to use and positive and effective in operation.

Other objects and advantages will become apparent from a consideration of the following description and appended claims in conjunction with the accompanying drawings, wherein:

Figure 1 is a side elevational view of a cross harrow illustrative of the invention, together with a fragmentary rear portion of an associated tractor;

Figure 2 is a top plan view of the cross harrow and tractor fragment illustrated in Figure 1;

Figure 3 is a rear elevational view of the harrow and an associated tractor;

Figure 4 is a cross-sectional view on the line 4—4 of Figure 2;

Figure 5 is a fragmentary cross-sectional view on the line 5—5 of Figure 4; and

Figure 6 is a fragmentary cross-sectional view on the line 6—6 of Figure 4.

With continued reference to the drawings, the harrow comprises a frame of rectangular shape, generally indicated at 10 and comprising side members 11 and 12 disposed in spaced apart and substantially parallel relationship to each other, a front end member 13 connected at its ends to the ends of the side members at the front side of the frame and a rear end member 14 connected at its ends to the ends of the side members at the rear end of the frame, the front and rear end members being substantially parallel to each other and substantially perpendicular to the side members. Longitudinal intermediate members 15 and 16 are disposed at opposite sides of and at substantially equal distances from the longitudinal center line of the frame and extend parallel to the side members 11 and 12 from the rear end member 14 past the front end member 13 to constitute a tongue structure for the harrow. At their front ends the intermediate members 15 and 16 are provided with eye formations, as indicated at 17 and 18, respectively, receiving bolts 19 and 20 which connect the eye formations at the front ends of the intermediate members to the rear ends of the tension links 21 and 22 of a farm tractor to provide a hitch between the harrow and the tractor. A spreader 23 is connected between the tension links 21 and 22 near the rear end of the latter to keep the rear ends of the tension links properly spaced in accordance with the distance between the intermediate longitudinal members 15 and 16 of the harrow frame which constitute the tongue structure.

An intermediate cross member 24 extends between the side members 11 and 12 between and substantially parallel to the front and rear end members of the frame and is disposed somewhat nearer the front end member 13 than the rear end member 14.

An axle 25 extends transversely of the frame below the latter and adjacent and substantially parallel to the rear end member 14. At its opposite ends this axle carries crank arms 26 and 27 respectively disposed at the outer sides of the side members 11 and 12 and extending rearwardly from the corresponding ends of the axle. Ground-engaging wheels 28 and 29 are journaled on the crank arms 26 and 27, respectively, to support the rear end of the harrow, the front end of the harrow being supported by the connection between the front ends of the members 15 and 16 and the rear ends of the traction links 21 and 22 of the tractor.

A lever arm 30 is connected at one end to the axle 25 adjacent the longitudinal intermediate member 16 and projects rearwardly from the axle. The intermediate member 16 is provided with a rearwardly extending, forked extension 31 having opposed legs 32 and 33, and a swivel collar 34 is disposed between the legs 32 and 33 and pivotally connected thereto by diametrically opposed pins on the collar rotatable received in apertures provided one in each of the legs 32 and 33 of the forked extension 31.

A screw-threaded nut 35 is pivotally secured to the lever arm 30 near the distal end of this arm, and a screw shaft 36 is rotatably received in the collar 34 and is threaded through the nut 35 carried by the lever arm 30. A hand crank 37 is provided on the upper end of the shaft 36, and a collar 38 fixed on the shaft bears on the upper end of the swivel collar 34. A nut 39 and lock nut 40 are threaded onto the shaft 36 at the lower end of the swivel collar 34, so that the nut 39 bears against the lower end of the swivel collar and is held in adjusted position along the screw shaft by the lock nut 40.

With this arrangement, when the screw shaft 46 is turned by the hand crank 37 in a direction to force the nut 35 away from the swivel collar 34, the rear end of the frame 10 will be raised and when the screw shaft is turned in the opposite direction, the rear end of the frame will be lowered.

A rectangular plate 41 is disposed at the outer side of the longitudinal intermediate member 15 and has one end bearing upon the front end member 13 of the frame and its other end bearing upon the cross member 24. This plate has transversely elongated apertures, as indicated at 42, in its opposite ends, and bolts, as indicated at 43, extend one through each of these elongated apertures and through registering apertures in the frame members 13 and 24 to secure the plate to the frame for limited movements of adjustment toward and away from the frame member 15 for a purpose which will presently appear.

A similar plate 44 is disposed at the outer side of the longitudinal intermediate member 16 bearing at its front end on the front end member 13 and at its rear end on the cross member 24, and this plate is provided with transversely elongated apertures 45 in its opposite ends. Bolts, as indicated at 46, extend one through each of the elongated apertures in the plate 44 and through registering apertures in the frame members 13 and 24 to secure the plate 44 to the frame for limited movements of adjustment toward and away from the intermediate frame member 16.

A bell-shaped housing 47 is secured at its upper, closed end to the plate 41 at the under side of this plate and a similar bell-shaped housing 48 is secured at its upper end to the under side of the plate 44. These housings 47 and 48 are centered relative to the plates 41 and 44, and depend from these plates toward the ground, as is clearly illustrated in Figures 3 and 4.

The housings and plates are provided with registering apertures at the centers of the closed upper ends of the housings, and anti-friction bearings are mounted one in each opening provided by the registering apertures in each plate and housing assembly.

As illustrated in Figure 4 for the assembly including the plate 44 and housing 48, the anti-friction bearing comprises a combined thrust and radial ball bearing 49 mounted in the registering apertures provided in the plate 44 and upper end wall of the bell-shaped housing 48. A spider 50 is mounted in the housing 48 near the lower open end of the housing and carries a centrally located anti-friction bearing 51. The housing 47 is provided with corresponding bearings and shafts 52 and 53 extend through the housings 47 and 48, respectively, and the associated plates 41 and 44, and are journaled in the anti-friction bearings provided in the corresponding housings.

Thrust bearing races 54 and 55 are mounted on the shafts 52 and 53, respectively, and bear on the upper sides of the bearings carried by the corresponding plates 41 and 44 and the upper ends of the associated housings and lower thrust bearing races, as indicated at 56 in Figure 4, are mounted one on each of the shafts 52 and 53 and bear against the under sides of the corresponding plate-mounted bearings. The shafts are thus journaled in the associated bearings and are held against longitudinal movement relative to the corresponding plates and bell housings. The bearings, such as the bearing 51, near the lower ends of the plates, support the shafts in position substantially perpendicular to the frame with their lower ends disposed below and their upper ends disposed above the frame.

Circular discs or plates 57 and 58 are mounted on the lower ends of the shafts 52 and 53 and provided respectively with sets of harrow teeth, as indicated at 59 and 60.

As illustrated in Figure 4, the shaft 53 is provided near its lower end with a collar 61 and with a portion 62 of reduced diameter immediately below the collar and extending through a centrally located hole in the plate 58. The end of the portion 62 remote from the collar 61 is externally screw-threaded and a nut 63 is threaded onto this screw-threaded portion and clamps the plate 58 between itself and the collar 61. The portion 62 is preferably of non-circular cross-sectional shape, or this portion and the plate are provided with a key and keyway arrangement for locking the plate and shaft together against relative rotation, so that the plate will be rotated when the shaft is driven.

The shaft 52 is secured to the center of the plate 57 by a similar construction and is drivingly connected to the plate.

The harrow teeth 64 of each of the sets 59 and 60 are arranged at substantially uniform, angular intervals around the marginal portions of the associated circular plates. Each tooth is provided at one end with a screw-threaded portion 65 of reduced diameter threaded through a corresponding tapped hole in the associated plate, so that the shoulder at the proximal end of the reduced portion bears against the under side of the plate. A lock nut 66 is threaded onto the screw-threaded portion 65 at the upper side of the plate and bears against the upper surface of the plate to firmly lock the tooth to the plate in position such that the tooth depends from the plate substantially perpendicular thereto. The lower end of each tooth is pointed, as indicated at 67, and the pointed ends of all of the teeth are substantially in a plane spaced from and parallel to the associated plate.

When the shafts 52 and 53 are driven, the sets of harrow teeth 59 and 60 will be moved in adjacent circular pairs and, as the harrow is drawn across a field, these circular pairs will be translated in the direction of movement of the harrow and thoroughly pulverizing the soil over which the teeth move.

A gear case or housing 68 is secured to the intermediate cross member 24 between the longitudinal intermediate members 15 and 16, and a bevel gear train is journaled in this housing. A stub shaft 69 is connected at one end to the bevel gear train and projects upwardly out of the housing between and substantially parallel to the shafts 52 and 53. Belt pulleys 70 and 71 are secured on the shafts 52 and 53, respectively, near the upper ends of these shafts, and belt pulleys 72 and 73 are secured on the stub shaft 69 above the frame 10 with the pulley 72 disposed above the pulley 73. The pulleys 70 and 71 are materially larger in diameter than the pulleys 72 and 73, and V-belts 74 drivingly connect the pulley 72 to the pulley 71, while similar V-belts 75 drivingly connect the pulley 73 to the pulley 70, as clearly illustrated in Figures 1 and 2.

A drive shaft 76 is connected at one end to the bevel gear train and projects out of the gear case 68 toward the front ends of the members 15 and 16. A universal joint 77 is connected to the front end of the drive shaft 76, and a universal joint 78 is connected to the tractor power take-off shaft 75. A variable length coupling shaft 80 connects the universal joints 77 and 78 to provide a driving connection between the tractor power take-off coupling and the drive shaft 76 and from thence through the stub shaft 69, the belt pulleys and the V-belts to the shafts 52 and 53 and the plates 57 and 58.

The tractor is provided with rearwardly extending, spaced apart lift arms 81 and 82 operated by hydraulic mechanism driven from the tractor engine in a manner well known to the art, and a chain 83 connects the lift arm 81 to the intermediate, longitudinal member 15 of the frame at a location spaced from the front end of this intermediate member, while a similar chain 84 connects the lift arm 82 to the longitudinal, intermediate member 16 at a location spaced from the front end of this member. The bolts 19 and 20 provide pivotal connections between the front ends of the members 15 and 16 and the rear ends of the traction links 21 and 22, so that when the lift arms 81 and 82 are moved upwardly, the entire harrow will be lifted above the pivotal axis of the connections provided by the bolts 19 and 20, as illustrated in broken lines in Figure 1.

The connection of the harrow to the lift arms 81 and 82 of the tractor provides means for lifting the harrow to an inoperative position and holding it in such inoperative position while the harrow is being transported from one place to another or turned at the ends of rows, while the screw shaft 36 provides means for adjustably varying the depth of operation of the harrow teeth in the soil.

The diameter of the plates 57 and 58 is such that these plates will operate in the space between adjacent rows of a row crop and the spacing between the plates is such that a row will pass between the plates and the corresponding sets of harrow teeth without damage to the plants in the middle row.

If desired, hoes may be attached to the plates to extend outwardly therefrom and chop or block plants from the adjacent rows so that the device can be used as a cotton chopper to perform two operations at the same time, namely, that of cultivating the cotton and thinning the rows.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a harrow, a generally horizontal frame having longitudinal side members and spaced cross members extending between and secured to the side members, said frame further comprising a pair of intermediate longitudinal members spaced from each other and from said longitudinal side members, said intermediate members having end portions extending longitudinally beyond one end of said frame, said end portions having means for connection to draft means of a tractor, horizontal plates mounted upon and extending longitudinally between adjacent ones of said cross members, at opposite sides of said pair of intermediate longitudinal members, vertical journal bearings on and extending through said plates, vertical shafts journalled through said bearings, said shafts having upper ends located above the plates and lower ends located below the plates, toothed vertical axis harrow rotors fixed on the lower ends of said shafts, pulleys fixed on the upper ends of said shafts, a gear assembly mounted on said frame between said pair of intermediate longitudinal members, said gear assembly comprising a horizontal shaft to which a power shaft of a tractor is adapted to be drivingly connected and a vertical shaft, a pair of vertically spaced pulleys on said vertical shaft of the gear assembly, and belts individually connecting the vertically spaced pulleys with the pulleys on the shafts of the harrow rotor shafts.

2. In a harrow, a generally horizontal frame having longitudinal side members and spaced cross members extending between and secured to the side members, said frame further comprising a pair of intermediate longitudinal members spaced from each other and from said longitudinal side members, said intermediate members having end portions extending longitudinally beyond one end of said frame, said end portions having means for connection to draft means of a tractor, horizontal plates mounted upon and extending longitudinally between adjacent ones of said cross members, at opposite sides of said pair of intermediate longitudinal members, vertical journal bearings on and extending through said plates, vertical shafts journalled through said bearings, said shafts having upper ends located above the plates and lower ends located below the plates, toothed vertical axis harrow rotors fixed on the lower ends of said shafts, pulleys fixed on the upper ends of said shafts, a gear assembly mounted on said frame between said pair of intermediate longitudinal members, said gear assembly comprising a horizontal shaft to which a power shaft of a tractor is adapted to be drivingly connected and a vertical shaft, a pair of vertically spaced pulleys on said vertical shaft of the gear assembly, and belts individually connecting the vertically spaced pulleys with the pulleys on the shafts of the harrow rotor shafts, said plates having portions slidably resting upon the adjacent frame cross members, said plate portions being formed with slots extending crosswise of the frame, and bolts engaged with the adjacent cross members and extending through the slots, said plates being slidably adjustable crosswise of the frame and toward and away from the vertical shaft of the gear assembly for tightening and loosening said belts, the bolts being tightenable to hold the plates in selected adjusted positions.

AMANDUS PETERS.
PHOSIPNEY FORBACH.
BENJAMIN J. STROTMAN.

References Cited in the file of this patent

UNITED STATES PATENTS

| Number | Name | Date |
| --- | --- | --- |
| 1,253,307 | Tveten | Jan. 15, 1918 |
| 2,045,209 | Thomas | June 23, 1936 |
| 2,193,157 | Ayo | Mar. 12, 1940 |
| 2,531,557 | Dayton | Nov. 28, 1950 |